United States Patent [19]

Steinka et al.

[11] Patent Number: 5,134,611
[45] Date of Patent: Jul. 28, 1992

[54] ANALOG/DIGITAL DATA DEVICE AND METHOD

[75] Inventors: Bradford R. Steinka, Stoughton; Gary B. Videlock, Foxboro; Eugene Y. G. Chang, Cambridge, all of Mass.

[73] Assignee: Microcom, Inc., Norwood, Mass.

[21] Appl. No.: 252,202

[22] Filed: Sep. 30, 1988

[51] Int. Cl.$^5$ .................. H04J 3/16; H04M 11/00
[52] U.S. Cl. ......................... 370/79; 370/24; 370/110.1; 379/93; 379/94
[58] Field of Search .................. 370/110.1, 58, 60, 94, 370/24, 79, 62; 375/10, 13; 379/157, 158, 202, 203, 201, 93, 94, 96

[56] References Cited

U.S. PATENT DOCUMENTS

| | | | |
|---|---|---|---|
| 4,620,294 | 10/1986 | Leung et al. | 370/24 |
| 4,663,754 | 5/1987 | Senoo | 370/110.1 |
| 4,680,781 | 7/1987 | Amundson et al. | 370/24 |
| 4,691,314 | 9/1987 | Bergins et al. | 370/94 |
| 4,731,782 | 3/1988 | Shimizu et al. | 370/110.1 |
| 4,746,986 | 5/1988 | Tanigawa | 379/93 |
| 4,750,165 | 6/1988 | Champagne et al. | 370/24 |

FOREIGN PATENT DOCUMENTS 2174269 10/1986 United Kingdom ............ 370/62

Primary Examiner—Douglas W. Olms
Assistant Examiner—Alpus H. Hsu
Attorney, Agent, or Firm—Wolf, Greenfield & Sacks

[57] ABSTRACT

A data communications method and system is provided to facilitate the communication between a plurality of units of data terminal equipment (DTE) connected over communication lines. A first DTE unit is located in a digital network and a second DTE unit is located in either a digital network or in an analog network. When attempting to place a call from the first DTE unit in the digital network to the second DTE unit in either a digital network or an analog network, a first call is made to determine the characteristics of the second DTE unit called. If the second DTE unit called returns an indication that it also possesses digital capability, then the call is established. If, however, the indication from the second DTE unit called is that it does not have digital capability, then the first DTE unit places a second call through a modem within a terminal adapter within the system to the second DTE unit. The system is also capable of receiving a call made to the first DTE from outside the digital network. The system also has the capability of establishing an error-free connection between the first DTE and second DTE units.

24 Claims, 4 Drawing Sheets

ANALOG/DIGITAL DATA DEVICE AND METHOD

BACKGROUND OF THE INVENTION

1. General

This invention relates generally to an analog/digital data device, and more particularly to a system and a method whereby communications between various pieces of Data Terminal Equipment (DTE) are effectuated in a error-free manner over both analog and digital networks.

At the Present time, the majority of the telephone networks operate in an analog fashion by utilizing electromagnetic waves to transmit messages, whereas computer systems operate in a digital fashion. Therefore, in order for one computer or DTE to communicate with another computer or DTE over distances where physical and permanent interconnection is impractical, the analog telephone lines are utilized. To effectuate the translation of digital signals to analog signals which the analog telephone system can handle, modems are well known in the art to be used to translate the signal from digital to analog in the form of electromagnetic waves (from the sending computer or DTE) using a modem connected to the sending DTE, transmitting the electromagnetic waves along the POTS (Plain Old Telephone System). The analog signals then enter a second modem which translates the analog signals back into digital signals and then to the receiving DTE or computer.

It is planned to gradually transform the present analog, electromagnetic wave-driven system to a pure digital system under the ISDN (Integrated Services Digital Network) standard. ISDN is specified by the CCITT I.series Recommendations. In such a system, when it is implemented, modems will no longer be needed because there will be no analog "leg" for which translation from digital to analog and back again from analog to digital is required.

However, it is most likely that the total transition from analog to digital will not take place either in the very near future nor at once when it does occur. Therefore, there will be a time period during which the analog and digital worlds will coexist, and equipment will be necessary to bridge the two worlds efficiently and effectively. This equipment will be required to allow the establishment of voice/data calls between users in an ISDN network and users in an analog network.

2. Description of the Prior Art

The technology exists today to establish voice calls between users in an ISDN network and users in an analog network. When a voice call is established, the telephone network, transparent to the user, automatically handles connections crossing the ISDN/analog network boundary. A user placing a voice call doesn't need to know that the call will cross the ISDN/analog network boundary. This is not the case when a data call is placed. The difference, of course, is that the data call is digital, not analog.

In the ISDN network, modems are not required, such that once a call is established between two DTE devices in the ISDN network, digital data is transferred in a digital format across the ISDN network.

In the prior art, one method for a user in the ISDN network to transfer data to a user in the analog network is to convert the data from digital to analog format at ISDN/analog network boundary. Several ISDN switch manufacturers use this method to provide data connectivity to the analog telephone network in which the digital to analog conversion is performed by modem pools. An ISDN user may establish a data call to a destination within the analog telephone network by first establishing a data call between the Terminal Adapter (TA) attached to the DTE device and the TA within the modem pool. Once the call between the two TAs has been established, the user must instruct the modem within the modem pool to establish a connection through the analog telephone network to the modem attached to the DTE at destination of the call. This two stage dialing process is cumbersome to a user on the ISDN network.

An analog user may establish a data call to a destination within the ISDN network, by first establishing a call between the modem attached to the DTE device and the modem in the modem pool. Once the connection between the modems is made, the user then instructs the second TA in the modem pool to establish a data call through the ISDN network to the first TA attached to the DTE at destination of the call. Again, this two stage dialing process is cumbersome to a user in the analog network.

At least one ISDN switch manufacturer is allowing users on the ISDN network to register two phone numbers with the ISDN switch. The first number is used by other users in the ISDN network to establish data calls with this device. The second number would be used by users in the analog network to establish data calls with this ISDN user. When the user in the analog network dialed the second telephone number, the data call would automatically be routed to the Modem in the Modem Pool. Once the connection between the modems was established, the ISDN network would automatically establish the connection between the second TA and the first TA. This would all be done transparently to the user in the analog network. Although this seems very convenient to the analog user, it becomes a management problem for the ISDN user.

Each time the ISDN user moves, he must register two numbers with the ISDN network. One for data calls from other ISDN users and one for data calls from user in the analog network. When giving out his phone number to a new user, he must check to see which network the new user is located on. It is much simpler for the ISDN user to deal with a single telephone number. Further, the ISDN/analog network boundary will be constantly changing as new sites receive ISDN service.

Once the data connection between the ISDN user and the analog user has been established, it should be noted that this connection is not a reliable, error-free, connection. While the ISDN protocol software can provide a reliable, error free connection between the first TA and the second TA, the RS-232 interface between the second TA and modem is not error-free. Parity, framing and flow control errors can occur at this interface which can corrupt user data. The connection between the first modem and the second modem may be a reliable, error-free connection provided that both modems implement an error-correcting protocol.

It is a principal object of the present invention to provide a data system and method in which communication may be established between a device at the S/T interface and a modem in the analog telephone network transparent to the ISDN and analog users.

Another object of the present invention is to provide a reliable, error free, data connection between ISDN and analog network users.

SUMMARY OF THE INVENTION

In accordance with the present invention, a data communications system is provided for facilitating voice/data communications between a DTE in an ISDN network and another DTE in a analog network.

Standards for establishing a data call through an ISDN network have been specified by several standards bodies, such as the CCITT in the I.series Recommendations. As part of the call establishment process, the call originator specifies a requested bearer capability (connection type) to be provided by the ISDN network. In the event the ISDN network cannot provide the requested bearer capability or the desired destination does not support the specified bearer capability, the ISDN network switch informs the call originator. Based on this information, the call originator cancels the call request.

The present invention uses the information returned by the ISDN switch to determine that the requested destination is not in the ISDN network. If a non-ISDN, analog, destination was specified, the present invention uses an internal modem to establish a data connection with the modem at the analog destination. Once the data connection is made, the ISDN device attempts to provide a reliable, error-free connection through the use of an error-correcting protocol. If the remote modem supports this error correcting protocol, a reliable connection can be obtained; otherwise, an unprotected modem connection is used.

Appendix A is a listing of computer instructions utilized for carrying out the device and method of the present invention.

DETAILED DESCRIPTION OF THE PREFERRED EMBODIMENT

Figure 1:
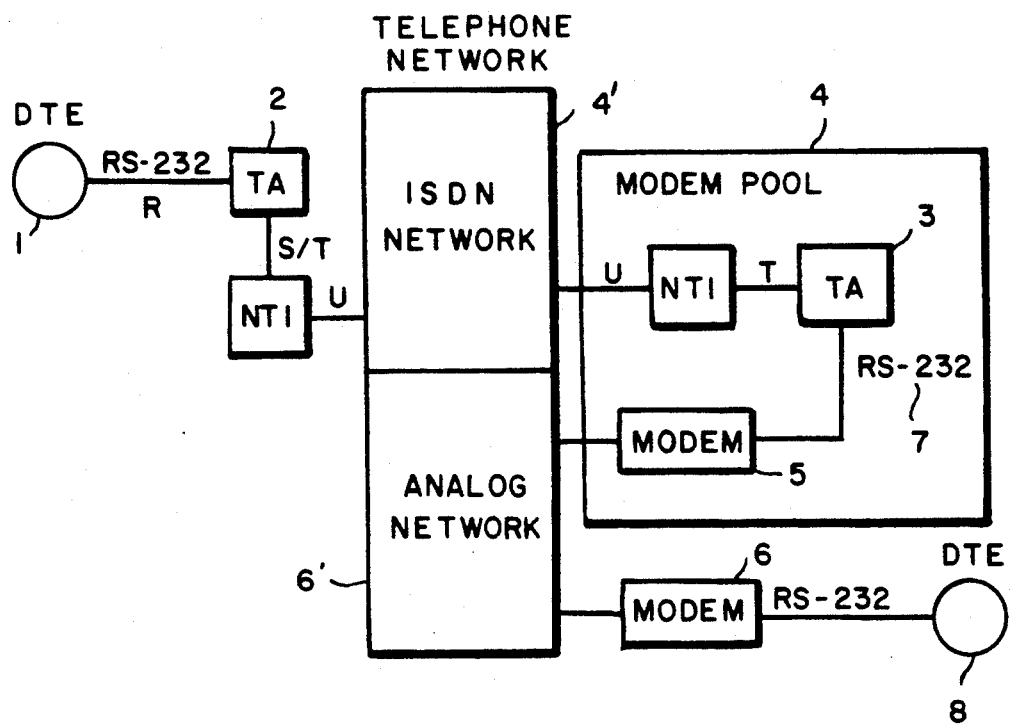
FIG. 1 is a generalized schematic view of a prior art system.

In prior art devices as shown in schematic form in FIG. 1, in which a user in an ISDN network wishes to place a call to another person in an analog network, the procedure is as follows. It is important to note for the purposes of the present invention that many times the caller does not know whether the destination is or is not a digital network.

An ISDN user at DTE 1 may establish a data call to a destination within the analog telephone network 8 by first establishing a D-channel or a B-channel data call between the Terminal Adapter (TA) at 2 attached to the DTE device 1 and the TA 3 within the modem pool 4 through the digital network 4'. Once the call between the two TAs has been established, the user at 1 instructs the Modem 5 within the modem pool 4 to establish a connection through the analog telephone network 6' to the Modem 6 attached to the DTE 8 at the destination of the call.

Conversely, an analog user at 8 may establish a data call to a destination 1 within the ISDN network by first establishing a call between the modem 6 attached to the DTE device 3 and the modem 5 in the modem pool 4. Once the connection between the modems is made, the user then instructs the TA 3 in the modem pool to establish either a D-channel or a B-channel data call through the ISDN network to the TA 2 attached to the DTE 1 at the destination of the call.

Once the data connection between the ISDN user at 1 and the analog user at 3 has been established, it should be noted that the resulting connection is not a reliable, error-free connection. The ISDN protocol software can provide an error-free connection between TA 2 and TA 3, but the RS-232 interface at 7 between TA 3 and modem 5 is not error-free. Parity, framing and flow control errors can occur at this interface which can corrupt user data. The connection between modem 4 and Modem 5 may be made to be a reliable, error free connection provided that both modems implement an error-correcting protocol. Thus, there is a discontinuity in the ability to correct errors in the system just described, a discontinuity which the present invention remedies.

Figure 2:
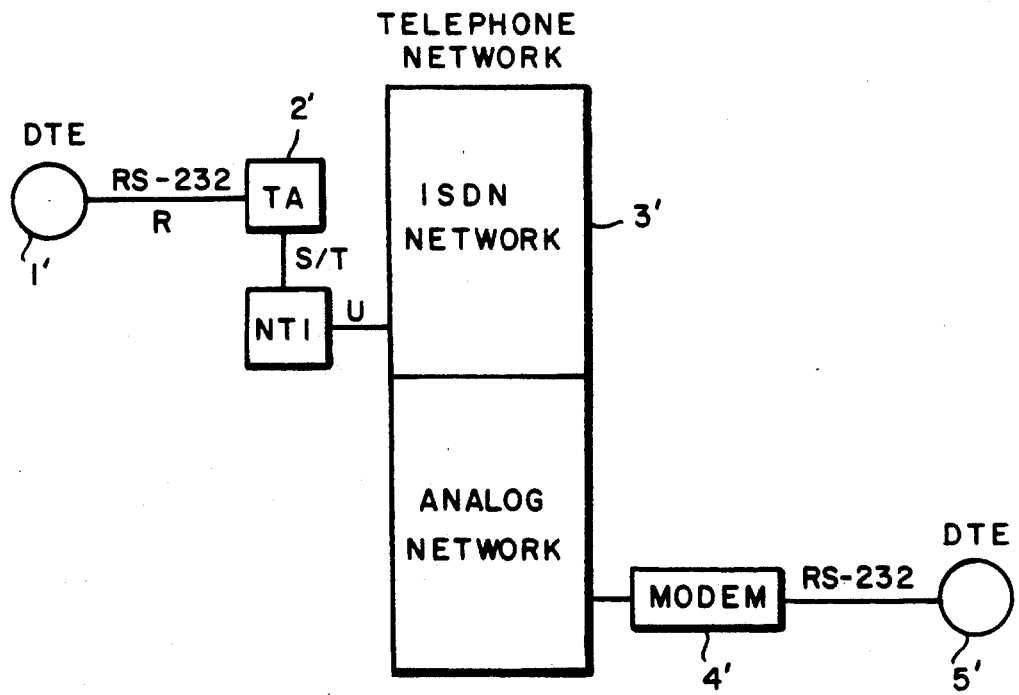
FIG. 2 is a generalized schematic view of the system of the present invention.

FIG. 2 is an overall view of the system encompassed by the device of the present invention. Referring to FIG. 2, a DTE $1^1$ is connected to its TA $2^1$ through the digital/analog network $3^1$ to a modem $4^1$ in the analog network to DTE $5^1$. As can be seen, this arrangement eliminates the need for modem pool 4 of the prior art device of FIG. 1 and its related deficiencies. The TA2' is shown in detail in FIG. 3.

Figure 3:
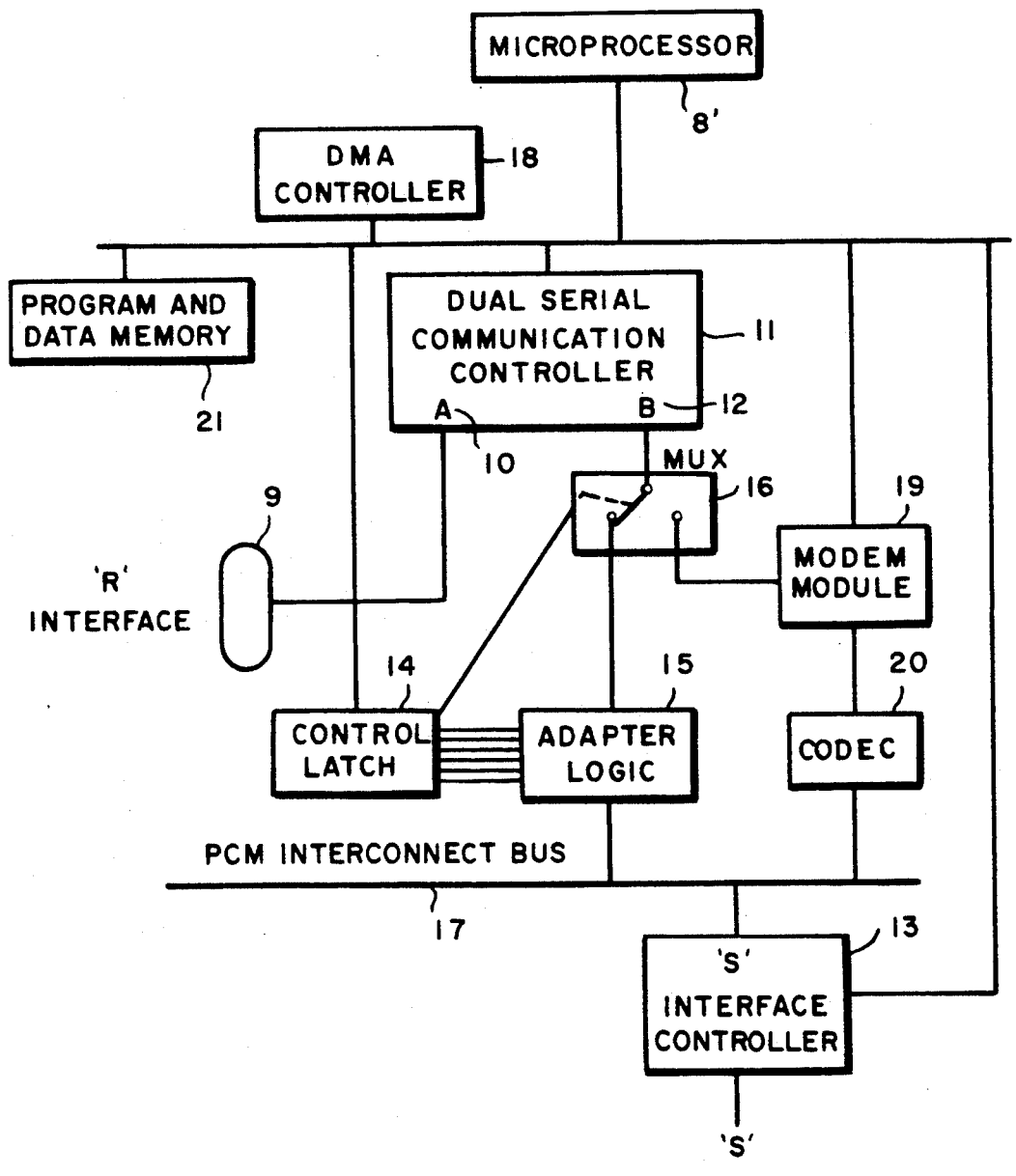
FIG. 3 is a block diagram of a circuit which implements the present invention.

Referring now to FIG. 3, there is shown a schematic diagram of the device of the present invention. A microprocessor 8' receives commands from a DTE device attached at the "R" interface 9 through channel A shown at 10 of the serial communications controller 11, requesting a data call to be established to a specified destination. The microprocessor 8' uses the ISDN layer 3 protocol, as specified in the CCITT I.series Recommendations to establish a B-channel, shown at 12, connection to a specified destination. The bearer capability during the call establishment is, in the first instance, specified to be digital information. All layer 3 protocol messages are sent/received on an ISDN D-channel through the "S" interface controller, shown at 13.

In the event that the call which specified a bearer capability of digital information is successful, the microprocessor 8' programs the control latch 14 to connect channel B of the serial communications controller 11 to the adapter logic 15 through multiplexer (MUX) 16. The adapter logic 15 places the output of the serial communications controller 11 onto the PCM (Pulse Code Modulation) bus 17 in the appropriate B-channel assigned by the ISDN switch when the call was established. The microprocessor 8' then programs the DMA controller 18 to receive data from the DTE device on channel A at 10 of the serial communications controller 11 and transmit the data using DMA 18 on channel B at 11 of the serial communications controller 11. The data then enters the adapter logic 15 which places the data in the appropriate B-channel on the PCM bus 17. The data is then transmitted into the ISDN network through the "S" interface controller 13.

If the response from the switch indicates that the destination is not an ISDN destination and therefore presumably an analog destination, the ISDN device initiates a new call; the bearer capability of the new call is specified to be speech information.

Once the connection has been established, the microprocessor 8' programs the control latch 14 to connect channel B of the serial communications controller 11, through a shifting of MUX 16, to the modem module 19 and then instructs the modem module 19 to go "off-hook" and establish a data connection through codec 20 with a remote modem in the analog destination. Of course, the use of a modem and its associated codec 20 is given by way of example only. A digital signal processor or other equivalent means would be useful to achieve the same or similar function as the modem 19 and codec 20. Once a modem connection is established, the microprocessor attempts to establish a reliable, error-free connection through the use of an error-correcting protocol between the internal modem 19 and the modem in the analog network. If successful, a reliable, error-free data connection will be established; otherwise an unprotected modem connection will be used when transmitting/receiving data to/from the modem module 19.

To facilitate more sophisticated communication, communication protocols which enable data communications between a wide range of computers, from low end microprocessors to large mainframes, have been developed.

A communication protocol is basically a set of rules that defines how the computers interact. For two computers to transfer data successfully, they must observe the same protocol. Typically, a protocol specifies when to send a message, how to format the information in the message, and at the other end, how to acknowledge the receipt of the message. As communications become more complex, the protocols must, in turn, become increasingly sophisticated.

Connecting two computers is only a small part of the communications work necessary for accurate data transfer. Telephone lines are often noisy, and errors can crop up in the transmitted data. These errors must be detected and corrected. The resources available to store incoming data must also be passed and matched so that the recipient is not flooded with data. These concerns, therefore, go beyond the physical level protocols into the realm of complex communications protocols.

One protocol which enables complex communications between modems, for example, is the Microcom Networking Protocol (MNP) which has been developed by Microcom, Inc. of Norwood, Mass., the assignee of the present application. MNP provides a sophisticated communications system which includes provisions for reliable data communications in a manner which can reasonably be implemented on a wide range of computers. MNP provides sophisticated error checking. As a result, error-free exchanges are thus possible between any computers using an MNP-based communication system.

The MNP link layer protocol is responsible for providing reliable, controlled data transmission over a medium that is inherently noisy and likely to cause errors. Once a physical connection is established between two machines, the link Protocol acts as a negotiator causing both computers to agree on the nature of the link. For example, the link protocol establishes whether the connection will be half-or full-duplex, how many data messages can be sent before confirmation is required, the size of a single data packet, etc. After establishing values for the above requirements, the link protocol initiates data transfer, paces the flow of data and, if necessary, retransmits data messages that contain errors due to telephone line noise. The link protocol allows blocks or packets of data (as opposed to individual bytes) to be sent synchronously or asynchronously to the receiving computer. Data transfer is thus faster when packets are transmitted synchronously because start and stop characters are not needed, and as a result, the ratio of data to control characters regulating the transfer is higher. Control is possible because of a mainframe-like (framing) technique in which a block of data is carried from both ends with specified codes.

With the implementation of MNP or other suitable error-correcting means, there will be an error-free path created from the modem 19 within the present invention and the modem 6 in the analog destination. In prior art devices, even if an error-correcting protocal such as MNP were utilized, there exists a discontinuity in the error-free connection, thus making the system susceptible to errors in the transmission. Once the type of modem connection is determined, all data from the DTE device is received through R interface 9 to channel A of the serial communications controller 11. The data is then sent to the modem module 19 through channel B at 12 of the serial communications controller 11. From the modem, the data passes through the codec 20 and is finally transmitted through the "S" interface controller 13 on the appropriate B-channel assigned by the ISDN switch when the call was established. A program and data memory 21 is provided for diagnostics and for program storage use by the present invention.

In the event that the modem module 19 within the ISDN device is not able to establish a connection with the remote modem, the call through the ISDN network is terminated.

Figure 4:
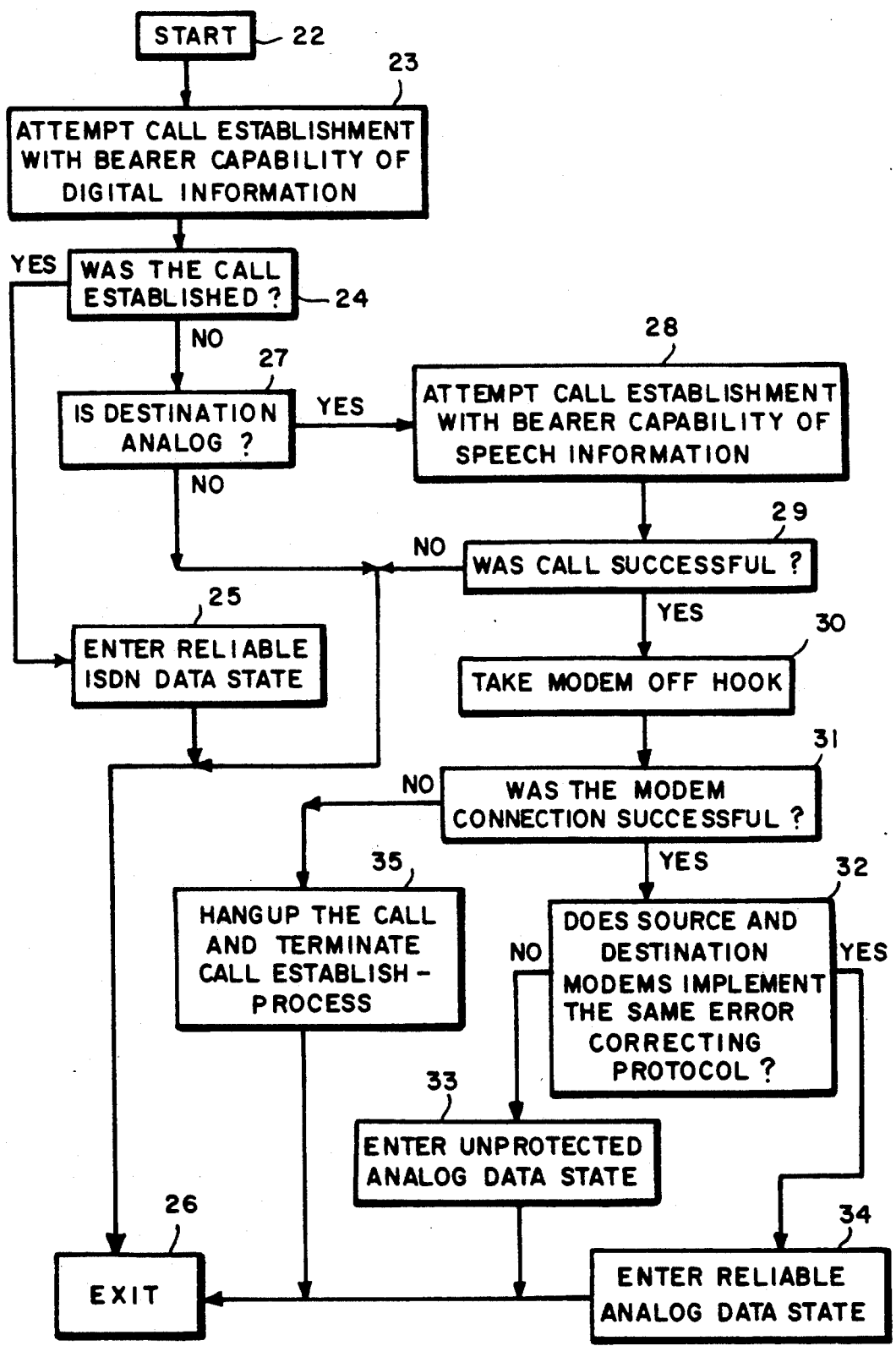
FIG. 4 is a flow diagram of the operation of the present invention in the outgoing call state.

A flow control diagram of the processing performed by the device of the present invention in the outgoing call mode is shown in FIG. 4.

Referring to FIG. 4 in steps 22 and 23, the device of the present invention will attempt to place a call assuming the destination is digital. If the destination is digital, it will be determined if the call was successfully established in step 24. If yes, then in step 25 the connection will be made and proceed to step 26 and exit. If the call was not established, then the present invention in step 27 checks the response from the network If the destination was not analog, then it will proceed to step 26 and exit. The foregoing describes the procedure for digital to digital network calls. However, if the answer returned in step 27 is that the destination is analog, then a new call is made in step 28 specifying bearer capability of speech information. In steps 29, 30 and 31 the present invention attempts to connect the internal modem or other device with the external analog destination. If the connection is successful, in steps 32, 33 and 34 it is determined whether an error-correcting routine is present or absent and the modems enter either into an error-correcting or a non-error-correcting data state until terminated in step 26. If a modem connection was not established in step 31, then the voice call is hung up in step 35 and proceeds to step 26, and exits.

Of course, means must be provided for calls made from an analog source to the device of the present invention. The device of the present invention is configured to automatically answer all incoming calls and treat them as data calls. When configured in this manner, an incoming voice call from the ISDN network is treated as a data call from an analog user. Any incoming digital call is treated as a data call from another ISDN user.

Referring now to FIG. 3, the microprocessor 8' receives incoming ISDN Layer 3 messages in the D-channel through the "S" interface controller 13 from the ISDN network. The microprocessor 8' accepts the incoming call by sending ISDN Layer 3 messages in the D-channel through the "S" interface controller 13 to the ISDN network.

The microprocessor 8' next examines the bearer capability contained in the incoming call message. If the bearer capability specifies a digital call, the microprocessor 8' programs the control latch 14 to connect channel B of the serial communications controller 11 to the adapter logic 15. The adapter logic places the output of the serial communications controller onto the PCM Bus 17 in the appropriate B-channel assigned by the ISDN switch when the call was established. Data is transferred between the DTE device at the "R" interface at 9 and the "S" interface controller at 13 as described above when the ISDN user originated the data call.

However, if the bearer capability indicates that the call is a voice call, the microprocessor 8' assumes that it is a data call from an analog source. The microprocessor 8' programs the control latch 14 to connect channel B of the serial communications controller 11 to the modem module at 19 and then instructs the modem module 19 to go "off hook" and establish a data connection with the remote modem. Once a modem connection is established, the microprocessor attempts to establish a reliable, error-free connection through the use of an error-correcting protocol (such as MNP described above) between the internal modem and the modem in the analog network. If successful, a reliable, error-free data connection will be established; otherwise an unprotected modem connection will be used when transmitting/receiving data to/from the modem module.

Once the type of modem connection is determined, all data received from the analog network arrives at the "S" interface controller 13 on the appropriate B-channel and is passed through the codec 22 and the modem module 19. The data is then received through channel B of the serial communications controller and transmitted through channel A of the serial communications controller 11 to the attached DTE device at the "R" interface 9.

In the event that the modem module within the ISDN device is not able to establish a connection with the remote modem, the call through the ISDN network is terminated.

Figure 5:
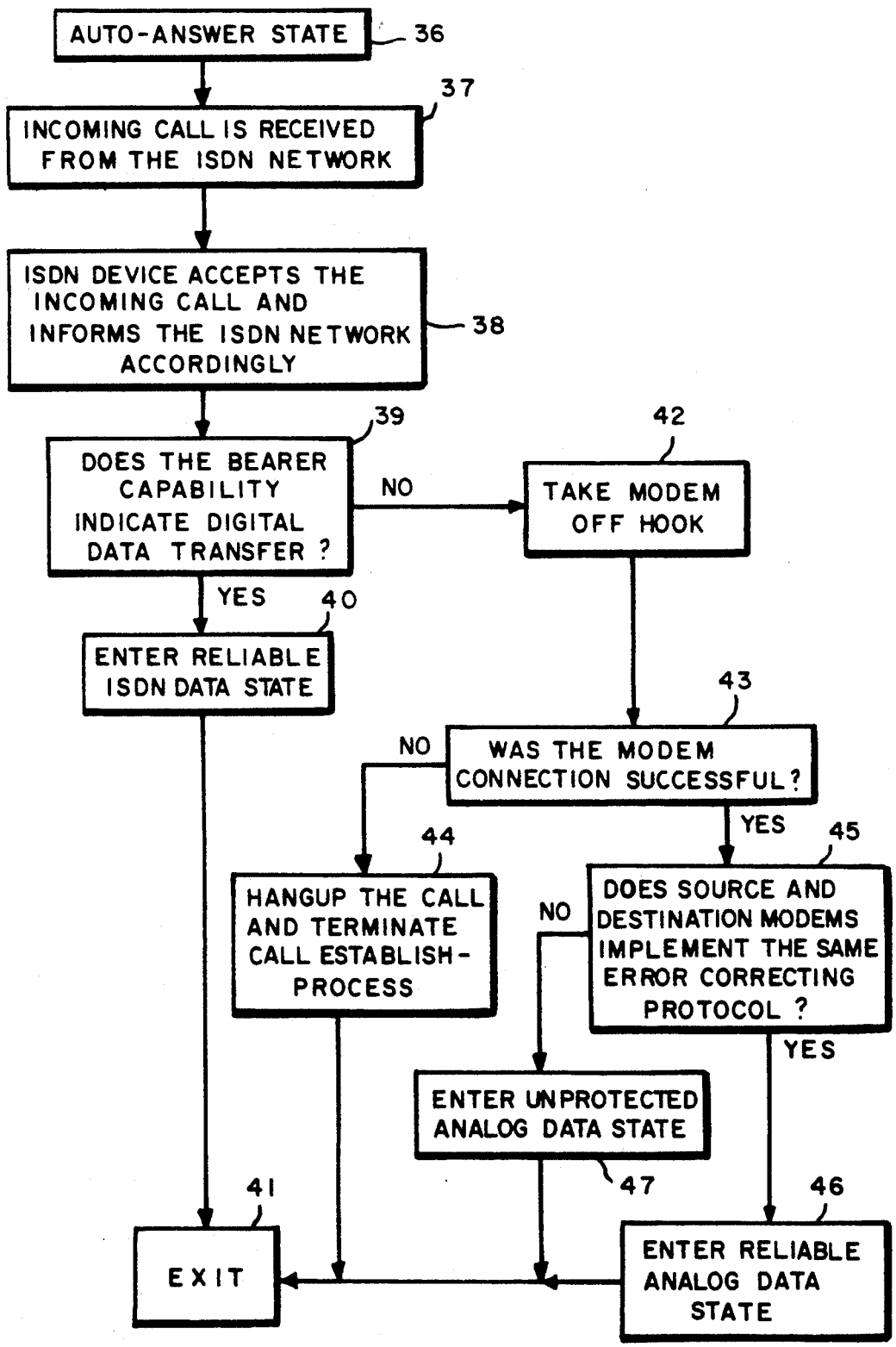
FIG. 5 is an additional flow diagram of the operation of the present invention in the incoming call state.

A flow control diagram of the processing performed by the ISDN device for an incoming call is shown in FIG. 5.

In FIG. 5, in step 36 the device is set to be in the auto-answer state. An incoming call is then received in step 37 from the digital network. The call is accepted and the ISDN network informed of this in step 38. If the bearer indicates that it is capable of a digital data transfer in step 39, then the call and device will enter an ISDN data state until termination in steps 40 and 41, respectively. If, however, the step 39 answer is negative, in step 42 the modem in the device of the present invention goes off-hook. In step 43, it is determined whether the modem connection was successful. If negative, in steps 41 and 41, the call is hung up and terminated. If affirmative, however, the modems exchange information in step 45 as to their error-correcting capabilities. They will then enter either step 46 or 47, depending on such capability, until exiting at 44.

The ISDN device of the present invention described herein allows a user to easily and reliably establish data connections with any remote device regardless of which telephone network the device is attached. Furthermore, it allows a reliable, error-free data connection to be established between an ISDN user and an analog user providing the modems in the analog network and the ISDN device have implemented the same error-correcting protocol.

While the foregoing invention has been described with reference to its preferred embodiments, variations and modifications will occur to those skilled in the art. Such variations and modifications are intended to fall within the scope of the appended claims.

What is claimed is:

1. A method of transmitting data between a plurality of units of data terminal equipment, wherein a first unit is located in a digital network and has associated with it a terminal adapter apparatus, the digital network being configured to respond to calls specifying bearer capability of either digital information or speech information and a second unit is located either in a digital network or an analog network, the method comprising the steps of:

(a) attempting to establish a digital network call from the first unit located in the digital network to the second unit, through the terminal adapter apparatus, specifying the call as a call with bearer capability of digital information;

(b) examining the response to the first unit from the digital network to the attempt to establish the digital call;

(c) utilizing a response from the digital network that the attempt to place a call as a call with bearer capability of digital information was successful, such that the second unit is located in a digital network, to connect said first and second units as a digital network call; and (d) utilizing a response from the digital network that the attempt to place a call as a call with bearer capability of digital information was unsuccessful, such that the second unit is located in an analog network, to cause the first unit to connect with the second unit as a non-digital network call with bearer capability of speech information through a digital converting device within the terminal adapter apparatus.

2. The method of claim 1, in which said digital converting device comprises a modem.

3. The method of claim 1, wherein said digital converting device is a digital signal processor.

4. The method of claim 1, further comprising the step of utilizing an error-correcting protocol between said first unit and said second unit.

5. A method of receiving data by a first unit of data terminal equipment wherein said first unit is located in a digital network and has associated with it a terminal adapter apparatus from a second unit of data terminal equipment located either in a digital or in an analog network, the digital network providing bearer capability information, the method comprising the steps of:

(a) examining the bearer capability information of said second unit;

(b) utilizing said bearer capability information to connect said first and second units as a digital network call if both units are located in digital networks; and (c) utilizing said bearer capability information to connect said first unit through a digital converting device within the terminal adapter apparatus to said second unit as a non-digital network call if said second unit is located in an analog network.

6. The method of claim 5, in which said digital converting device comprises a modem.

7. The method of claim 5, wherein said digital converting device is a digital signal processor.

8. The method of claim 5, further comprising the step of utilizing an error-correcting protocol between said first unit and said second unit.

9. A system for transmitting data between a plurality of units of data terminal equipment, wherein a first unit is located in a digital network and has associated with it a terminal adapter apparatus, the digital network being configured to respond to calls with bearer capability of either digital information or speech information, and a second unit is located either in a digital network or an analog network, comprising:

(a) means for attempting to establish a digital network call from the first unit located in the digital network to the second unit through the terminal adapter apparatus by specifying the call as a call with bearer capability of digital information.

(b) means for examining the response to the first unit from the digital network to the attempt to establish the digital call;

(c) means for utilizing a response from the digital network that the attempt to place a call as a call with bearer capability of digital information was successful, such that the second unit is located in a digital network, to connect said first and second units as a digital network call; and (d) means for utilizing a response from the digital network that the attempt to place a call as a call with bearer capability of digital information was unsuccessful, such that the second unit is located in an analog network, to cause the first unit to connect with the second unit as a non-digital network call with bearer capability of speech information through a digital converting device within the terminal adapter apparatus.

10. The system of claim 9, in which said digital converting device comprises a modem.

11. The system of claim 9, wherein said digital converting device of a digital signal processor.

12. The system of claim 9, wherein the digital converting device operates under an error-correcting protocol and the error-correcting protocol is utilized between said first unit and said second unit if said second unit is located in an analog network.

13. A system for receiving data by a first unit of data terminal equipment wherein said first unit is located in a digital network and has associated with it a terminal adapter apparatus from a second unit of data terminal equipment located in either a digital or an analog network, the digital network providing bearer capability information, comprising:

(a) means for examining the bearer capability information of said second unit;

(c) means for utilizing the bearer capability information from said second unit to connect said first and second units as a digital network call if both units are located in digital networks; and (c) means for utilizing the bearer capability information from said second unit to connect said first unit through a digital converting device within the terminal adapter apparatus to said second unit as a non-digital network call if said second unit is located in an analog network.

14. The system of claim 13, in which said digital converting device comprises a modem.

15. The system of claim 13, wherein said digital converting device is a digital signal processor.

16. The system of claim 13, wherein the digital converting device utilizes an error-correcting protocol and the error-correcting protocol is utilized between said first unit and said second unit if said second unit is located in an analog network.

17. A method of transmitting data between a plurality of units of data terminal equipment, wherein a first unit is located in a digital network and has associated with it a terminal adapter apparatus, the digital network being configured to respond to calls specifying bearer capability of either digital information or speech information, and a second unit is located either in a digital network or in a analog network, the method comprising the steps of:

(a) attempting to establish a digital network call from the first unit located in the digital network to the second unit through the terminal adapter apparatus, specifying the call as a call with bearer capability of digital information;

(b) examining the response to the first unit from the digital network to the attempt to establish the digital call; and (c) utilizing a response from the digital network that the attempt to place a call as a call with bearer capability of digital information was unsuccessful, such that the second unit is located in an analog network, to cause the first unit to connect with the second unit as a non-digital network call through a digital converting device within the terminal adapter apparatus.

18. A method of receiving data by a first unit of data terminal equipment located in a digital network and having associated with it a terminal adapter apparatus from a second unit of data terminal equipment located in an analog network, the digital network providing bearer capability information, the method comprising the steps of:

(a) examining the bearer capability information of said second unit;

(b) utilizing said bearer capability information to connect said first unit through a digital converting device within the terminal adapter apparatus to said second unit.

19. A system for transmitting data between a plurality of units of data terminal equipment, wherein a first unit is located in a digital network and has associated with it a terminal adapter apparatus, the digital network being configured to respond to calls specifying bearer capability of either digital information or speech information, and a second unit is located either in a digital network or in a analog network, comprising:

(a) means for attempting to establish a digital network call from the first unit located in the digital network to the second unit through the terminal adapter apparatus, specifying the call as a call with bearer capability of digital information;

(b) means for examining the response to the first unit from the digital network to the attempt to establish the digital call; and (c) means for utilizing a response from the digital network that the attempt to place a call as a call with bearer capability of digital information was unsuccessful, such that the second unit is located in an analog network, to cause the first unit to connect with the second unit as a non-digital network call through a digital converting device within the terminal adapter apparatus.

20. A system for receiving data by a unit of data terminal equipment wherein said first unit is located in a digital network and has associated with it a terminal adapter apparatus from a second unit of data terminal equipment located in an analog network, the digital network providing bearer capability information, comprising:

(a) means for examining the bearer capability of said second unit;

(b) means for utilizing the bearer capability information from said second unit to connect said first unit through a digital converting device within the terminal adapter apparatus to said second unit.

21. In a system for transmitting data between a plurality of units of data terminal equipment, wherein a first unit is located in a digital network and a second unit is located either in a digital or an analog network, the digital network being configured to respond to calls specifying bearer capability of either digital information or speech information, terminal adapter apparatus operatively connected to the first unit, the terminal adapter apparatus comprising:

(a) means for receiving commands from the first unit requesting a data call to the second unit;

(b) means for attempting to establish a digital call from the first unit in the digital network to the second unit through the terminal adapter by specifying the call as a call with bearer capability of digital information;

(c) means within the terminal adapter for utilizing a response from the digital network that the attempt to place a call as a call with the bearer capability of digital information was successful, such that the second unit is located in a digital network, to connect said first and second units as a digital network call; and (d) means within the terminal adapter for utilizing a response from the digital network that the attempt to place a call as a call with bearer capability of digital information was unsuccessful, such that the second unit is located in an analog network, to cause the first unit to connect with the second unit as a non-digital network call with bearer capability of speech information through a digital converting device within the terminal adapter.

22. A method of transmitting data between a plurality of units of data terminal equipment, wherein a first unit is located in a digital network and has associated with it a terminal adapter apparatus, the digital network being configured to respond to calls specifying bearer capability of either digital information or speech information, and a second unit is located either in a digital network or an analog network, the method comprising the steps of:

(a) attempting to establish a digital network call from the first unit located in the digital network to the second unit through the terminal adapter apparatus, specifying the call as a call with bearer capability of digital information;

(b) examining the response to the first unit from the digital network to the attempt to establish the digital call;

(c) utilizing a response from the digital network that the attempt to place a call as a call with bearer capability of digital information was successful to connect said first and second units as a digital network call; and (d) utilizing a response from the digital network that the attempt to place a call as a call with bearer capability of digital information was unsuccessful to cause the first unit to connect with the second unit as a non-digital network call through a digital converting device within the terminal adapter apparatus.

23. A method of transmitting data between a plurality of units of data terminal equipment, wherein a first unit is located in a digital network and has associated with it a terminal adapter apparatus, the digital network being configured to response to calls specifying bearer capability of either digital information or speech information, and wherein a second unit is located either in a digital network or an analog network, the method comprising the steps of:

(a) attempting to establish a digital network call from the first unit located in the digital network to the second unit through the terminal adapter apparatus and specifying the call as a digital call with bearer capability of digital information;

(b) utilizing a response from the digital network that the attempt to place a call as a call with bearer capability of digital information was successful, indicating that the second unit is located in digital network, to connect said first and second units as a digital network call;

(c) utilizing a response from the digital network that the attempt to place a call as a call with bearer capability of digital information was unsuccessful to cause the call to be terminated and to be placed again as a new attempted call specifying bearer capability of speech information;

(d) establishing the new call as a call with bearer capability of speech information if the attempt of step (c) was successful;

(e) attempting to connect the new call through a digital converting device within the terminal adapter apparatus to the second unit;

(f) if the attempt of step (e) was unsuccessful, terminating the new call, and if the attempt of step (e) was successful, connecting the new call through the digital converting device and then attempting to establish a reliable call through the use of an error-correcting protocol;

(g) if the attempt of step (f) is successful, establishing the call as an analog reliable network call; and, (h) if the attempt to step (f) is not successful, establishing the call as an analog non-reliable network call.

24. A method of receiving data by a first unit of data terminal equipment wherein the first unit is located in a digital network and has associated with it a terminal adapter apparatus, the digital network being configured to respond to calls specifying bearer capability of either digital information or speech information, from a second unit of data terminal equipment located either in a digital or in an analog network, the method comprising the steps of:

(a) receiving a call from the digital network by the first unit through the terminal adapter apparatus;
(b) determining whether the call received from the second unit possesses a bearer capability indicating the call is digital information;
(c) if the call is digital information, connecting the first unit to the second unit as a digital network call;
(d) if the call received from the second unit does not indicate bearer capability indicating the call is digital information, attempting to connect the call through a digital converting device within the terminal adapter apparatus;
(e) if the attempt in step (d) was unsuccessful, terminating the call received from the second unit;
(f) if the attempt in step (d) was successful, determining whether the digital converting device implements an error-correcting protocol;
(g) if the digital converting device implements an error-correcting protocol, establishing the call as an analog reliable network call; and
(h) if the digital converting device does not implement an error-correcting protocol, establishing the call as an analog, non-reliable network call.

* * * * *

UNITED STATES PATENT AND TRADEMARK OFFICE
CERTIFICATE OF CORRECTION

PATENT NO. : 5,134,611                                    Page 1 of 2

DATED     : July 28, 1992

INVENTOR(S) : BRADFORD R. STEINKA, GARY B. VIDELOCK, Y.G. CHANG EUGENE

It is certified that error appears in the above-identified patent and that said Letters Patent is hereby corrected as shown below:

Claim 9, column 9, line 27, delete "." and substitute therefor --;--;

Claim 11, column 9, line 50, delete "of" and substitute therefor --is--;

Claim 13, column 9, line 65, delete "(c)" and substitute therefore --(b)--;

Claim 17, column 10, line 24, delete "a" and substitute therefor --an--;

Claim 19, column 10, line 63, delete "a" and substitute therefor --an--;

Claim 21, column 11, line 43, delete "the";

Claim 23, column 12, line 22, delete "response" and substitute therefor -- respond--;

Claim 23, column 12, line 35, after "in", insert --the--;

UNITED STATES PATENT AND TRADEMARK OFFICE
CERTIFICATE OF CORRECTION

PATENT NO. : 5,134,611

DATED : July 28, 1992

INVENTOR(S) : BRADFORD R. STEINKA, GARY B. VIDELOCK, EUGENE Y.G. CHANG

It is certified that error appears in the above-identified patent and that said Letters Patent is hereby corrected as shown below:

CLaim 23, column 12, line 58, delete "to" and substitute terefor --of--.

Signed and Sealed this

Twenty-eighth Day of September, 1993

Attest:

BRUCE LEHMAN

Attesting Officer    Commissioner of Patents and Trademarks